March 3, 1970   KAZUHIKO TSUBOSHIMA ET AL   3,499,064
PROCESS AND APPARATUS FOR PRODUCING BIAXIALLY ORIENTED
THERMOPLASTIC TUBULAR FILMS
Filed Feb. 16, 1968

KAZUHIKO TSUBOSHIMA,
TOMOYUKI MATSUGU,
TERUCHIKA KANOH AND
KUNIO NAKAMURA,
INVENTORS

BY Wendroth, Lind & Ponack.
Attorneys

United States Patent Office 3,499,064
Patented Mar. 3, 1970

3,499,064
PROCESS AND APPARATUS FOR PRODUCING BI-AXIALLY ORIENTED THERMOPLASTIC TUBULAR FILMS
Kazuhiko Tsuboshima, Tomiyuki Matsugu, Teruchika Kanoh, and Kunio Nakamura, Shizuoka-ken, Japan, assignors to Kohjin Company Limited, Tokyo, Japan, a corporation of Japan
Continuation-in-part of application Ser. No. 541,193, Apr. 8, 1966. This application Feb. 16, 1968, Ser. No. 706,172
Claims priority, application Japan, May 19, 1965, 40/29,468; June 4, 1965, 40/33,096
Int. Cl. B29d 23/04; B29c 17/06, 17/07
U.S. Cl. 264—40                                       8 Claims

ABSTRACT OF THE DISCLOSURE

Process for the continuous and stable production of biaxially oriented thermoplastic tubular film having uniform stretching ratios, in which the tubular film is supplied to the apparatus continuously, heated to a suitable temperature, and stretched simultaneously in biaxial directions by expansion, while two air-rings, one surrounding the unstretched region and the other surrounding the region after stretching is completed of the film, provide two positive currents of air, and automatically controlling the pressure of gas inside the tubular film so as to maintain the diameter thereof at a substantially constant value Apparatus for carrying out the method is provided.

---

Figure 1:
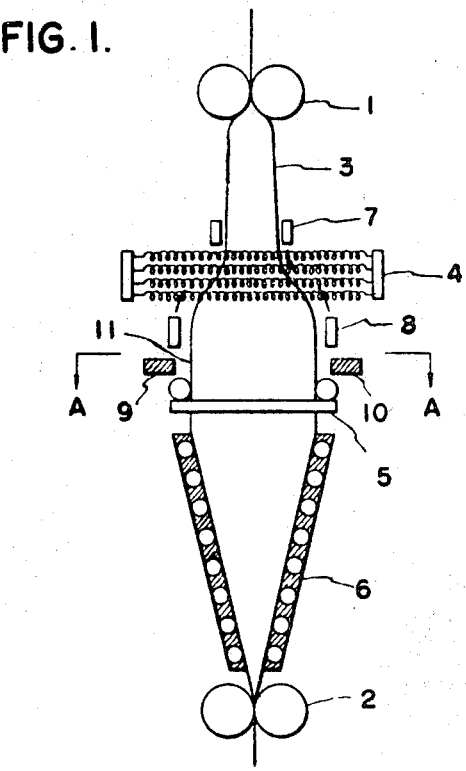

This application is a continuation-in-part of copending application, Ser. No. 541,193, filed Apr. 8, 1966, now abandoned.

This invention relates to a process and an apparatus for the continuous production of biaxially oriented thermoplastic tubular films by stretching tubular films simultaneously in biaxial directions; that is, in longitudinal and transverse directions thereof.

A biaxially oriented film may be produced by the well-known process in which a thermoplastic tubular film is moved downwardly between two vertically spaced pairs of horizontal nip-rollers, with successive circumferential regions of the film being heated at one location to the temperature at which the film can be oriented, and stretched simultaneously in biaxial directions by adjusting both the pressure of a gas inside the tubular film and the circumferential speed of the nip-rollers.

In the above process, however, for attaining a constant and uniform stretching of the tubular film in a continuous manner, it is critical that the heated region undergoing stretching and the regions adjacent thereto, and especially the portion of the stretching region where the film starts to stretch or yield, be maintained substantially uniform in temperature in its circumferential direction. For this purpose, it is most important that the exchange of heat between the film and the surrounding atmosphere be properly controlled.

Where the heat balance between such regions of the film and the surrounding atmosphere is not uniform in the circumferential direction of the film, the temperature of the heated regions can never be maintained equal in a circumferential direction, even if such regions are initially heated uniformly in the circumferential direction by ring heaters.

Therefore, in order to maintain each of the successive regions of the tubular film at a temperature which is substantially equal circumferentially thereof, it has been found important that the air around the region undergoing stretching and the regions adjacent thereto, and especially at the portion of the stretching region at which the film starts to stretch or yield, be moved uniformly longitudinally of the tubular film but remain stationary in the circumferential direction of such film an extensive survey of methods and apparatuses for moving the air in such manner proved a certain compulsory or positive flow of air to be exceedingly efficient for the purpose.

More particularly, combined application of two compulsory or positive flows of air permits heated regions of the film to be stretched in a constant and uniform way. One such air is caused to move opposite or countercurrent to the travel of the film from along stretched regions thereof and is directed toward the portion of the stretching region at which the film starts to stretch or yield. The other is an air flow which moves concurrently with the film from along unstretched regions thereof and is also directed toward the portion of the stretching region at which the films starts to stretch or yield.

In order that the tubular film may be subjected to uniform stretching ratios in a constant and continuous operation, the pressure of the gas inside the tubular film must be controlled, to maintain a constant stretching ratio in the transverse direction, since such gas tends to leak at the nip-rollers with the travel of the film, while a constant stretching ratio in the machine direction can easily be maintained by controlling the circumferential speed of the two pairs of nip-rollers.

Therefore the present invention relates to a process for the continuous and stable production of a biaxially oriented thermoplastic tubular film which has been subjected to uniform stretching ratios. In this process a tubular film is supplied or advanced continuously, heated at one location along successive circumferential regions with one or more infrared heaters to a suitable temperature, and stretched simultaneously in biaxial directions, by expansion and by being advanced to and from the location of heating at different rates of speed. Two air-rings, one surrounding unstretched regions of the film and the other surrounding stretched regions thereof blow streams of air along the outer surface of the film in opposite directions with respect to each other and toward the portion of the stretching region at which the film starts to stretch or yield. The diameter of the expanded tubular film is maintained substantially constant, using a device arranged outside of the film which can press or relax the expanded tubular film to a required extent without influencing the stretching state and the travelling velocity of the film. This device is operable when a variation in the diameter of the film is detected by suitable means, and the detection results are transmitted to a driving mechanism which operates the device, so that the pressure of gas inside the tubular film can be automatically controlled to thereby maintain the diameter at a substantially constant value.

Further, this invention relates to an apparatus suitable for the above process which comprises means for continuously supplying or advancing a tubular film between two pairs of nip-rollers which together serve to contain a gas within the tubular film and to stretch such film in a longitudinal direction, means for heating at one location successive circumferential regions of the film to a temperature suitable for stretching and orientation, means for providing compulsory or forced streams of air along the outer surface of the film, one from unstretched regions of the film and the other from stretched regions, which are directed toward the portion of the stretching region at which the film starts to stretch or yield, and means for detecting variations in the diameter of the stretched tubular film and transmitting the detected variations through a mechanical system to a pressure control device which automatically responds to control the pressure of gas inside the tubular film.

The compulsory transfer or positive flow of air can be realized in the following way. An annular air-ring is placed around stretched regions of the tubular film and is equipped with an annular discharge slit which directs a compulsory stream of air along the outer surface of the stretched film regions toward the portion of the stretching region at which the film starts to stretch or yield; that is, in the direction opposite or countercurrent to the travel of the film. Another annular air-ring is placed around unstretched regions of the tubular film and is equipped with an annular discharge slit which directs a compulsory stream of air along the outer surface of the film toward the portion of the stretching region at which the film starts to stretch or yield; that is, in the direction of film travel. The outlet slits of the air-rings are preferably positioned at a distance of 3 to 20 mm. from the film surface. The air is at room temperature or is at a precontrolled suitable temperature.

The process of this invention will be explained in detail with reference to the apparatus as shown in the accompanying figures of drawing as an example. The drawings show schematically one example of the apparatus suitable for realizing the present invention.

Figure 2:
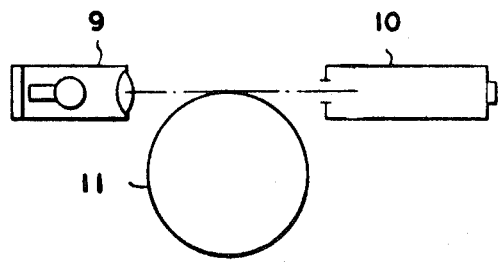

FIG. 1 is a diagrammatic showing of the aforesaid apparatus. FIG. 2 is a similar showing of a gauging device, hereinafter described in greater detail.

In FIG. 1, an unoriented thermoplastic tubular film 3 passes downward through low-speed nip-rollers 1, is fed with compressed air into the inside thereof by some suitable means, stretched as seen in the figure while being heated to a temperature at which orientation is possible by radiant heat from a ring-heater 4 as it passes therethrough, passed relative to controlling rollers 5 arranged in the form of parallel crosses, cooled by the surrounding air, then flattened by a flattening and pressure control device 6 and finally passed through high-speed nip-rollers 2.

The ring heater 4 comprises one or more infrared heaters. An air-ring 8 is placed between the ring heater 4 and the pressure control device 6 and is provided with an annular air outlet or discharge slit which is directed upwardly. An air-ring 7, on the other hand, is positioned between the low speed nip-rollers 1 and the region at which the film is heated and stretched and is provided with an annular air outlet or discharge slit which is directed downwardly. The distance of the outlet slits from the film surface is from 3–20 mm. The amount and the velocity of the air blowing from each air ring are appropriately established so that air streams entirely uniform and stationary in the circumferential direction of the film are formed over the whole surface of the film around the stretching region and regions adjacent thereto, and especially at the portion of the stretching region at which the film starts to stretch or yield.

If only the air ring 8 is employed, with the air ring 7 being omitted, the distribution range of temperature in the circumferential direction of the film, along the portion of the stretching region where the film starts to stretch, varies by more than about 10° C. This results in less homogeneity and more variations in the film wall thickness and also involves difficulties in attaining a stable and continuous operation for producing uniformly stretched films, as compared to that obtained when the air ring 7 is also used.

On the other hand, if only the air-ring 7 is employed, without use of the air-ring 8, the distribution range of temperature in the circumferential direction of the film varies, as a result of movement of the tubular film in a transverse direction, thus causing difficulties in attaining a stable and continuous operation for producing uniformly stretched films.

As has been described heretofore, for stable and continuous production of uniformly stretched films it is required that the temperature of the tubular films, in the circumferential direction, be maintained constant by providing air streams which are entirely uniform and stationary in the circumferential direction of the films over the whole surface of the film around the stretching region and regions adjacent thereto, and especially along the portion of the stretching region at which the film starts to stretch. This cannot be performed with the air-ring 7 or the air-ring 8 alone and can be achieved only when both of such rings are used.

A light beam projector 9, comprising a light source and a condenser lens, and a photocell 10 are placed between the ring heater 4 and the flattening and pressure control device 6. The photocell 10 is connected, via a meter relay and then a control circuit, with a driving device to operate the pressure control device. The projector 9, the photocell 10, the meter relay and the control circuit function together as a gauging means for detecting variations in the diameter of the stretched film and for transmitting proper signals to the driving device.

The above described projector 9 and the photocell 10 are positioned, as shown in FIG. 2, face to face on a tangent to a horizontal section 11 of the stretched tubular film, so that a light beam of parallel ray from the projector 9, the intensity of which is stabilized, has a predetermined width in the horizontal plane and at least a fraction of such beam is projected tangentially to the surface of the film. Thus the photocell detects variations of light quantity due to irregular or spherical reflection at the surface of the film and transmits a signal via the meter relay and the control circuit to the driving device which operates the pressure control device 6.

Variations in the diameter of the stretched film may be detected by any means or any mechanism, and the invention not restricted to the electrical gauging means as described above. The location at which the film is gauged for variations is also arbitrarily selected regardless of the shape of the film, tubular or folded. In order to secure a higher degree of uniformity in the diameter of the expanded films, variations in the diameter of the stretched tubular film are most effectively detected immediately after stretching by the optical means as shown in the figure.

The pressure control device 6 is composed of two groups of free or idler rollers, each group consisting of several parallel rollers supported in a plane by a suitable frame. The two frames of rollers are arranged in a V shape, as is seen in FIG. 1, and the angle between such frames can be varied by changing the inclination of the frames in either direction by pivoting the same at their lower ends. This is performed by the action of the driving device described hereinbefore. When the driving device operates, the angle between the frames is changed, which in turn compresses or releases the portion of the tubular film which is between the rollers of such frames and automatically adjusts the pressure of the gas inside the tubular film. Hence the tubular film is maintained at a prefixed diameter and thus a homogeneous stretching ratio in the transverse direction can be secured.

Although the pressure control device in FIG. 1 functions also to flatten the tubular films, the two functions may be separated if necessary. In case where the rollers in the device 6 are too resistant to allow the film to travel smoothly, they may be adjusted to rotate in accordance with the progress of film. Further, the pressure control device can be modified, for example, with caterpillarlike endless belts which move in accordance with the progress or travel of the film.

In the actual stretching process, when a fraction of gas confined in the tubular film by the two pairs of nip-rollers happens to leak therefrom for some reason, the pressure of the gas inside the tubular film decreases, causing a simultaneous decrease in the diameter of the film. Such decrease in the film diameter is detected by the photocell 10 as a varied quantity of light and a signal is transmitted to the pressure control device 6. This device in turn presses the tubular film to recover the original pressure and return the tubular film to its original diameter, thus maintaining a uniform stretching ratio in the transverse direction.

If for some reason the temperature of the film at the stretching region exceeds a predetermined temperature, the diameter of the tubular film increases with a simultaneous decrease in the gas pressure within such tubular film. Owing to the varied quantity of light received by the photocell 10, the pressure control device operates to increase the inside gas pressure, and hence reduces the diameter of the tubular film until its original one is regained, and thus the uniform stretching ratio in the transverse direction can be maintained.

EXAMPLE 1

An unoriented polypropylene tubular film of 48 mm. diameter and 180μ thickness was introduced into the apparatus as illustrated in FIG. 1 at a speed of 4 m./min. Compressed air was introduced into the inside of the tubular film. The film was then stretched three times in both longitudinal and transverse directions under heating with five infrared ring heaters of 1.5 kw. and simultaneous blowing of air at room temperature at the rate of 6 and 20 liters/sec., respectively from air-rings 7 and 8 equipped with ring slits of 55 and 180 mm. diameter.

Immediately below the air-ring 8 was provided a light source of nominal value 6 v.-8 w. A horizontal beam of parallel ray made by a convex lens of 20 mm. focal length was arranged so that at least a fraction of the beam projected tangentially to the surface of film.

A CdS photocell positioned in the path of the beam detected variations in the quantity of light projecting on it and a meter relay was connected to its output, with the variation being expressed by a moving pointer of the relay.

The allowable limits of light variation between which substantially constant diameter of the film could be maintained were pre-established, for example, on indicator pointers of the meter relay. When the moving pointer traversed one of the limits, an electrical signal was emitted which, via a magnetic switch, operated a motor into forward or reverse rotation or to a stop, depending upon the meaning of the signal. The rotation of the motor was transmitted through a reduction mechanism to the pressure control device described in the preceding paragraphs, which then changed the angle between the frames of rollers, and thus controlled the diameter of the stretched film.

In this way, stretched tubular films of a uniform stretching ratio in the transverse direction could be continuously produced with a diameter variation within 0.2%, as measured when the film is folded or flattened and with a thickness variation of within 20%.

When the air-ring 7 was omitted, and all other conditions remained the same, the temperature distribution range in the circumferential direction of the tubular film exceeded about 10° C., especially at the portion of the stretching region at which the film started to stretch, and thus failed to provide the desired temperature uniformity, and resulted in film wall thickness variations of over 40%. Therefore uniformly stretched films could not be produced constantly and continuously.

EXAMPLE 2

Polyvinyl chloride resin internally plasticized and having an average polymerization degree of 700 was melted at 190° C. and extruded in a tubular form to obtain an unoriented polyvinyl chloride tubular film having a diameter of 70 mm. and a thickness of 200μ. This tubular film was introduced into an apparatus as shown on the drawings at a velocity of 3 m./min. Compressed air was introduced into the inside of the tubular film. The film was then heated with four infrared ring heaters of 1.5 kw. and stretched three times in both longitudinal and transverse directions while air at room temperature was blown at the rate of 23 liters/sec. and 7 liters/sec. respectively from the air ring 8, having a ring slit of 230 mm. in diameter, and from the air ring 7, having a ring slit of 80 mm. diameter. Variation in the film diameter was detected in a similar way as in Example 1 and the results as detected were transmitted to a driving device which operated a pressure controlling device so that the pressure inside the tubular film was automatically controlled to control the diameter of the expanded film.

In this way, a stretched tubular film was stably and continuously produced at a diameter variation within 0.2%, as measured when the film is folded, and at a thickness variation within 20%.

What is claimed is:

1. A process of producing biaxially oriented thermoplastic film including the steps of advancing a preformed, unoriented tubular film of thermoplastic material continuously in a longitudinal direction and relative to a gas under pressure contained therein, at one location heating to an orientation temperature successive circumferential regions of the tubular film as it is advanced relative to the contained gas whereby such regions of the tubular film are stretched transversely by the contained gas, advancing the tubular film toward and away from the one location at different rates of speed whereby the successive heated regions of the tubular film are stretched longitudinally substantially simultaneously with the transverse stretching thereof, and from locations around stretched and unstretched regions of the tubular film directing streams of air under pressure along the periphery of the tubular film and toward circumferential portions of the heated regions at which the film starts to stretch.

2. A process as defined in claim 1 further including the steps of gauging the stretched tubular film to detect variations in the diameter thereof and in response to variations in the diameter of the tubular film adjusting the pressure exerted upon the exterior surface of the stretched tubular film to thereby vary the pressure exerted by the gas contained therein.

3. A process as defined in claim 1 wherein at the locations around the stretched and unstretched regions of the tubular film the air streams are spaced from 3 to 20 mm. from the film surface.

4. A process as defined in claim 1 wherein the air of the streams directed along the periphery of the tubular film is substantially at room temperature.

5. Apparatus for producing biaxially oriented film including spaced pairs of nip rollers for engaging with and flattening a tubular film for containing a gas under pressure therein, means for driving said spaced pairs of nip rollers at different rates of speed for continuously advancing and tensioning in a longitudinal direction a tubular film passing between said nip rollers, means located between said spaced pairs of nip rollers for heating to an orientation temperature successive circumferential regions of a tubular film as it is being advanced whereby such heated regions are stretched substantially simultaneously in transverse and longitudinal directions, and individual means located between said heating means and each pair of nip rollers for directing streams of air under pressure along the periphery of the tubular film and toward circumferential portions of the heated regions at which the film starts to stretch.

6. Apparatus as defined in claim 5 wherein the means for directing streams of air along the periphery of the tubular film includes a pair of air rings each having an annular discharge slit, said air rings being positioned with their annular discharge slits disposed in generally opposed relationship.

7. Apparatus as defined in claim 5 further including a device adapted to engage with and apply pressure to the exterior surface of the stretched tubular film as it is advanced beyond the heating means and toward one pair of said nip rollers, means for gauging the stretched tubular film for detecting variations in the diameter thereof and means actuated by said gauging means for adjusting said device to vary the pressure applied to the exterior surface of the tubular film and thereby vary the pressure exerted by the contained gas on the heated regions of the tubular film.

8. Apparatus as defined in claim 7 wherein said device serves also to flatten the stretched tubular film upon itself and includes a pair of frames between which the stretched tubular film is adapted to be advanced, each of said frames including a series of rollers for engaging with the advancing tubular film, and pivot means hingedly supporting said frames at their ends adjacent to said one pair of nip rollers.

References Cited
UNITED STATES PATENTS

| | | | |
|---|---|---|---|
| 2,987,767 | 6/1961 | Berry et al. | 264—95 |
| 3,061,876 | 11/1962 | Lloyd et al. | 18—14 X |
| 3,302,241 | 2/1967 | Lemmer et al. | 18—14 |

FOREIGN PATENTS

| | | |
|---|---|---|
| 917,033 | 8/1954 | Germany. |
| 954,254 | 4/1964 | Great Britain. |

ROBERT F. WHITE, Primary Examiner

T. J. CARVIS, Assistant Examiner

U.S. Cl. X.R.

18—14; 264—89, 95